United States Patent
Krishnaswamy et al.

(10) Patent No.: US 7,499,953 B2
(45) Date of Patent: Mar. 3, 2009

(54) ONLINE RECOVERY OF USER TABLES USING FLASHBACK TABLE

(75) Inventors: Vasudha Krishnaswamy, Fremont, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 411 days.

(21) Appl. No.: 10/831,449

(22) Filed: Apr. 23, 2004

(65) Prior Publication Data

US 2005/0240633 A1    Oct. 27, 2005

(51) Int. Cl.
G06F 17/30    (2006.01)
G06F 7/00    (2006.01)

(52) U.S. Cl. .............................. 707/202; 707/101; 707/3

(58) Field of Classification Search ................. 707/202, 707/101, 3
See application file for complete search history.

(56) References Cited

U.S. PATENT DOCUMENTS

| | | | |
|---|---|---|---|
| 4,498,145 A | 2/1985 | Baker et al. |
| 4,868,744 A | 9/1989 | Reinsch et al. |
| 5,249,300 A | 9/1993 | Bachman et al. |
| 5,280,612 A | 1/1994 | Lorie et al. |
| 5,317,731 A | 5/1994 | Dias et al. |
| 5,347,653 A | 9/1994 | Flynn et al. |
| 5,363,473 A | 11/1994 | Stolfo et al. |
| 5,414,834 A | 5/1995 | Alexander et al. |
| 5,440,730 A | 8/1995 | Elmasri et al. |
| 5,481,699 A | 1/1996 | Saether |
| 5,524,205 A | 6/1996 | Lomet et al. |
| 5,638,508 A | 6/1997 | Kanai et al. |
| 5,701,480 A | 12/1997 | Raz |
| 5,758,356 A | 5/1998 | Hara et al. |
| 5,819,020 A | 10/1998 | Beeler, Jr. |
| 5,835,698 A | 11/1998 | Harris et al. |
| 5,845,292 A | 12/1998 | Bohannon et al. |
| 5,850,507 A | 12/1998 | Ngai et al. |
| 5,862,318 A | 1/1999 | Habben |
| 5,864,849 A | 1/1999 | Bohannon et al. |
| 5,870,758 A | 2/1999 | Bamford et al. |
| 5,873,102 A | 2/1999 | Bridge, Jr. et al. |
| 5,890,161 A | 3/1999 | Helland et al. |
| 5,890,167 A | 3/1999 | Bridge, Jr. et al. |

(Continued)

FOREIGN PATENT DOCUMENTS

FR    2746526 A1    9/1997

OTHER PUBLICATIONS

Oracle8™ Concepts, vol. 1, Release 8.0, Dec. 1997, ORACLE®.□□ (pp. 18-14, 21-8 and 24-8 through 24-20).*

(Continued)

*Primary Examiner*—Kuen S Lu
(74) *Attorney, Agent, or Firm*—Vista IP Law Group, LLP.

(57) ABSTRACT

A method and apparatus for updating databases are disclosed. In response to a flashback request, a database object is restored to a state as of a specified flashback time. The changes introduced into the database object are reversed in a sequence starting with a change introduced into the database object immediately before issuance of the flashback request and ending with a change introduced into the database object immediately after the specified flashback time.

35 Claims, 4 Drawing Sheets

U.S. PATENT DOCUMENTS

| | | | |
|---|---|---|---|
| 5,907,848 A | 5/1999 | Zaiken et al. | |
| 5,923,833 A | 7/1999 | Freund et al. | |
| 5,940,839 A | 8/1999 | Chen et al. | |
| 5,956,731 A | 9/1999 | Bamford et al. | |
| 5,963,959 A | 10/1999 | Sun et al. | |
| 5,966,706 A | 10/1999 | Biliris et al. | |
| 5,974,427 A | 10/1999 | Reiter | |
| 5,995,980 A | 11/1999 | Olson et al. | |
| 5,996,088 A * | 11/1999 | Frank et al. | 714/6 |
| 5,999,943 A | 12/1999 | Nori et al. | |
| 6,012,060 A | 1/2000 | Loaiza et al. | |
| 6,014,674 A | 1/2000 | McCargar | |
| 6,018,746 A | 1/2000 | Hill et al. | |
| 6,138,121 A | 10/2000 | Costa et al. | |
| 6,154,847 A | 11/2000 | Schofield et al. | |
| 6,173,292 B1 | 1/2001 | Barber et al. | |
| 6,182,241 B1 | 1/2001 | Ngai et al. | |
| 6,185,699 B1 | 2/2001 | Haderle et al. | |
| 6,192,370 B1 | 2/2001 | Primsch | |
| 6,192,377 B1 | 2/2001 | Ganesh et al. | |
| 6,237,001 B1 | 5/2001 | Bamford et al. | |
| 6,289,335 B1 | 9/2001 | Downing et al. | |
| 6,321,234 B1 | 11/2001 | Debrunner | |
| 6,341,288 B1 | 1/2002 | Yach et al. | |
| 6,363,499 B1 | 3/2002 | Delo et al. | |
| 6,405,217 B1 | 6/2002 | Lee | |
| 6,438,749 B1 | 8/2002 | Chamberlain | |
| 6,449,624 B1 | 9/2002 | Hammack et al. | |
| 6,457,021 B1 | 9/2002 | Berkowitz et al. | |
| 6,480,848 B1 | 11/2002 | DeKimpe et al. | |
| 6,513,093 B1 | 1/2003 | Chen et al. | |
| 6,529,921 B1 | 3/2003 | Berkowitz et al. | |
| 6,567,928 B1 | 5/2003 | Lyle et al. | |
| 6,618,822 B1 | 9/2003 | Loaiza et al. | |
| 6,631,374 B1 | 10/2003 | Klein et al. | |
| 6,640,244 B1 | 10/2003 | Bowman-Amuah | |
| 6,678,696 B1 | 1/2004 | Helland et al. | |
| 6,769,074 B2 | 7/2004 | Vaitzblit | |
| 6,801,915 B1 | 10/2004 | Mack | |
| 6,804,672 B1 | 10/2004 | Klein et al. | |
| 6,889,231 B1 * | 5/2005 | Souder et al. | 707/104.1 |
| 6,918,053 B1 | 7/2005 | Thatte et al. | |
| 7,010,529 B2 | 3/2006 | Klein et al. | |
| 7,103,597 B2 | 9/2006 | McGoveran | |
| 7,206,805 B1 | 4/2007 | McLaughlin | |
| 7,277,900 B1 | 10/2007 | Ganesh et al. | |
| 2002/0007363 A1 * | 1/2002 | Vaitzblit | 707/202 |
| 2004/0030954 A1 | 2/2004 | Loaiza et al. | |
| 2005/0125430 A1 * | 6/2005 | Souder et al. | 707/100 |
| 2005/0131966 A1 * | 6/2005 | Lou | 707/204 |
| 2005/0193035 A1 * | 9/2005 | Byrne | 707/202 |
| 2006/0212492 A1 | 9/2006 | Jacobs et al. | |

OTHER PUBLICATIONS

Oracle8™ Concepts, vol. 1, Release 8.0, Dec. 1997, Oracle®. (pp. 18-14, 21-8 and 24-8 through 24-20).*

Lee, C. et al. "Temporal Grid File: A file structure for interval data" Data & Knowledge Engineering 26 (1998) pp. 71-97.

Amagasa, T. et al. "Implementing Time-Interval Class for Managing Temporal Data", International Workshop on Database and Expert Systems Applications (Aug. 26, 2003) pp. 84,88,843-849.

Perry, J.T. et al. Understanding Oracle, 1989, Sybex, 1st ed., pp. 4-7, 43, 95 and 161-164.

Weikum, et al. "Multi-Level Recovery" ACM (1990) pp. 109-123.

Strom et al. "Optimistic Recovery in Distributed Systems" ACM Transactions on Computer System (Aug. 1995) vol. 3, No. 3, pp. 204-226.

Gomes et al. "Multiplexed State Saving for Bounded Rollback" Proceedings of the 1997 Winder Simulation Conference, Atlanta, GA pp. 460-467.

Microsoft Word User's Guide, Microsoft Corporation, 1993, pp. 14, 15, 40.

Triantafillou, P. "Independent Recovery in Large-Scale Distributed Systems" IEEE Transactions on Software Engineering (Nov. 1996) vol. 22, No. 11, pp. 812-826.

Wiener, J.L. et al. "A System Prototype for Warehouse View Maintenance" VIEWS (1996) pp. 26-33 (provided reference has been numbered pp. 1-8).

Ramakrishnan, R., Database Management System, WCB/McGraw-Hill, 1998, pp. 529-533.

* cited by examiner

ONLINE RECOVERY OF USER TABLES USING FLASHBACK TABLE

FIELD

Embodiments of the invention relate to computer systems, and more particularly to database data recovery.

BACKGROUND OF THE INVENTION

In database systems, a "transaction" refers to an atomic set of operations performed against a database, which may access, create, modify or delete database data or metadata. A "commit" occurs when the transaction has completed its processing and any changes to the database by the transaction are ready to be permanently implemented in the database system.

Transaction log records can be maintained in a database system to allow data recovery in the event of an error, that may include hardware failure, network failure, process failure, database instance failure, data access conflicts, user errors, and statement failures in database access programs.

Various types of transaction log records can be maintained in a database system for data recovery. One type of log record that may be maintained is the "undo" record. Undo records contain information about changes that were introduced into the database system. For example, if a row in a table was modified, the changes will be stored in the undo record associated with the block of the database system that includes the modified table row.

Conventional database systems do not include built-in mechanisms to undo changes made by a committed transaction without taking database systems offline. Moreover, conventional database systems do not include built-in mechanisms to recover data after several committed transactions took place without taking database systems offline.

There are several data recovery mechanisms currently available and utilized for some type of data recovery, however, neither one solves the above stated problem. For example, a "flashback database" feature is an off-line operation that provides backup of the entire database. Maintaining a backup copy of the entire database system requires configuring and utilizing a lot of resources. Moreover, even when recovery is required for only a single row of a singe table, the entire database system is replaced with the backup copy.

Another existing recovery mechanism, attempting on unsuccessfully solving the above-stated problem, is Create Table As Of (CTAF) query that returns a copy of the specified table as of the specified time. However, this operation does not preserve indexes and constraints and simply re-creates the data. Moreover, if only a single row was changed and needs to be recovered, the CTAF operation re-creates the entire table regardless of its size.

Import/Export operations may be used in conventional database systems to achieve table recoveries in case of system errors, however, import/export operations also recover entire tables even in situations wherein recovery of only a single row of data is necessary. In addition, in order for the import/export operation to succeed, the export operation has to take place at the flashback time.

What is needed, therefore, is a solution that overcomes these and other shortcomings of the prior art.

SUMMARY OF THE INVENTION

Methods and apparatuses for data recovery in database systems are disclosed. Embodiments of the invention comprise restoring a database object to a state as of a specified flashback time in response to a flashback request by reversing the changes in a sequence starting with a change introduced into the database object immediately before issuance of the flashback request and ending with a change introduced into the database object immediately after the specified flashback time.

BRIEF DESCRIPTION OF THE DRAWINGS

The invention is illustrated by way of example and not limitation in the figures of the accompanying drawings, in which like references indicate similar elements and in which.

DETAILED DESCRIPTION

Methods and apparatuses for recovering data in database systems are described. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those skilled in the art. Thus, the invention can include any variety of combinations and/or integrations of the embodiments described herein.

Exemplary Architecture

Figure 1:
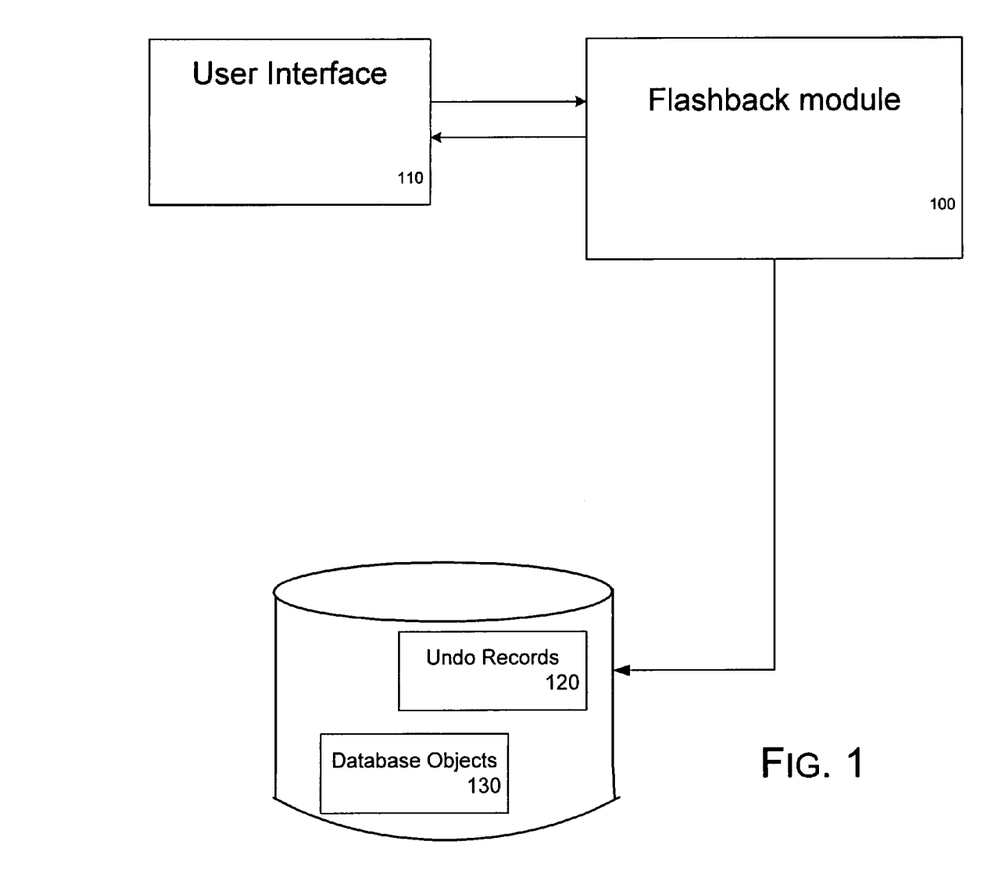
FIG. 1 illustrates an exemplary architecture according to one embodiment of the invention.

FIG. 1 illustrates exemplary architecture according to one embodiment of the invention. Flashback module 100 responds to users issuing flashback statements via user interface 110. In order to respond to flashback requests, the flashback module 100 utilizes undo records 120 to restore a specified database object to a state as of time specified in a flashback statement. The undo records 120 are associated with database objects 130, as described below.

Methodology

With these concepts in mind, embodiments of the invention can be further described.

According to one embodiment of the invention, during initialization stage of the database system, a database manager is prompted to set a storage space limit parameter to specify an amount of memory space to be allocated for undo records containing information about changes introduced into database objects. For example, allocation of 100 G of space may provide data retention for up to 7 days depending on a database activity level. Alternatively, the database manager may specify time period, for example, one day, during which any changes introduced into the database objects should be stored and available in undo records. The storage space limit or time period parameters, collectively undo retention limit parameters, can be set per database system or per tables within the system. It will be appreciated that the retention time limit parameters may be stored per portions of database objects and the invention is not limited to the techniques described above. Thus, according to one embodiment of the invention, each object within the database system may be associated with different amount of undo retention information identifying changes made to the associated database object.

Figure 2:
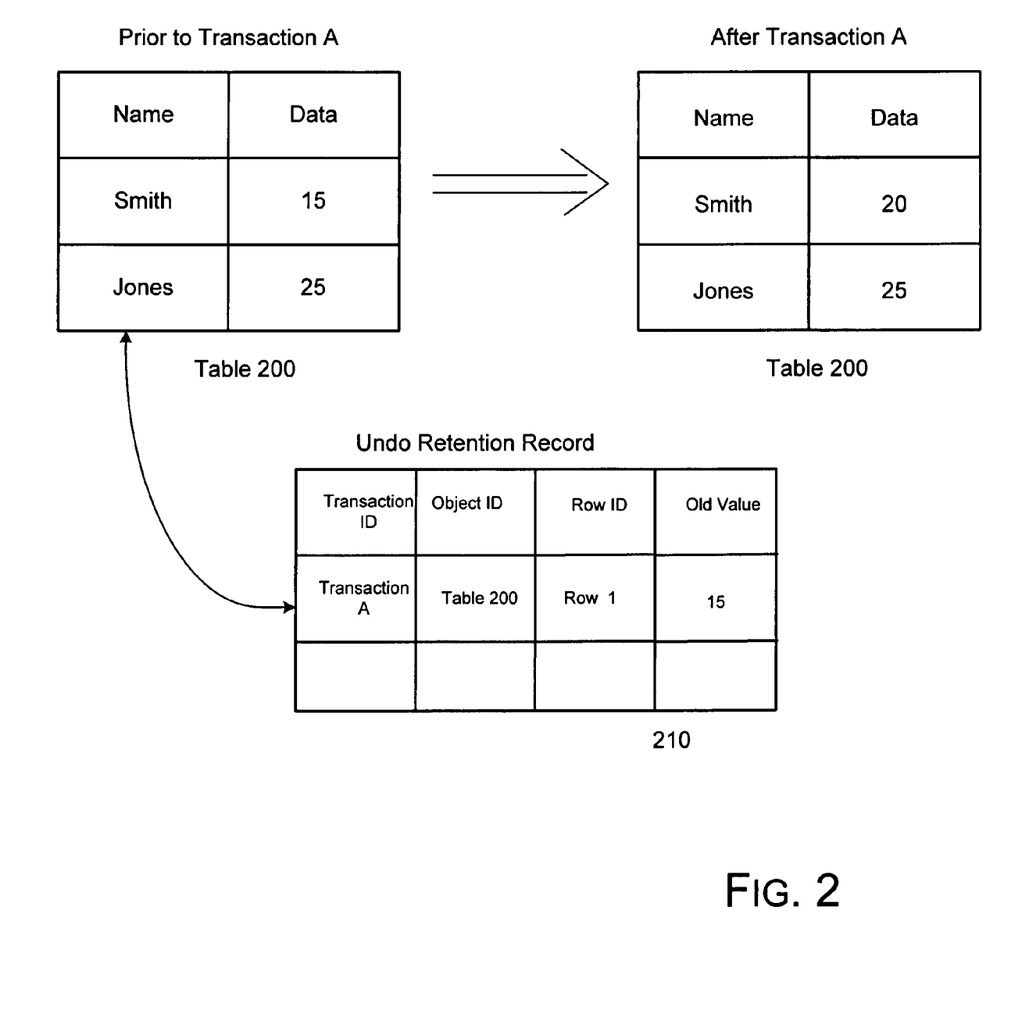
FIG. 2 illustrates undo records associated with a database table according to one embodiment of the invention.

Upon initialization of the database system, including the undo retention limit parameters, changes introduced by each committed transaction are stored in the appropriate undo records associated with the transaction and the changed object. For example, table 200 of FIG. 2 is associated with undo record 210, which identifies changes introduced into the table 200 by each transaction modifying the table. The undo records are kept for the period of time specified by the undo retention limit parameters or as long as there is storage space available for creating and maintaining undo records. If storage space limit is being exceeded, then the oldest undo records are expired and the subsequent undo records are written in place of the expired ones. Storing undo retention information per each committed transaction is known in the art and no further details are necessary to further the understanding of the invention.

Figure 3:
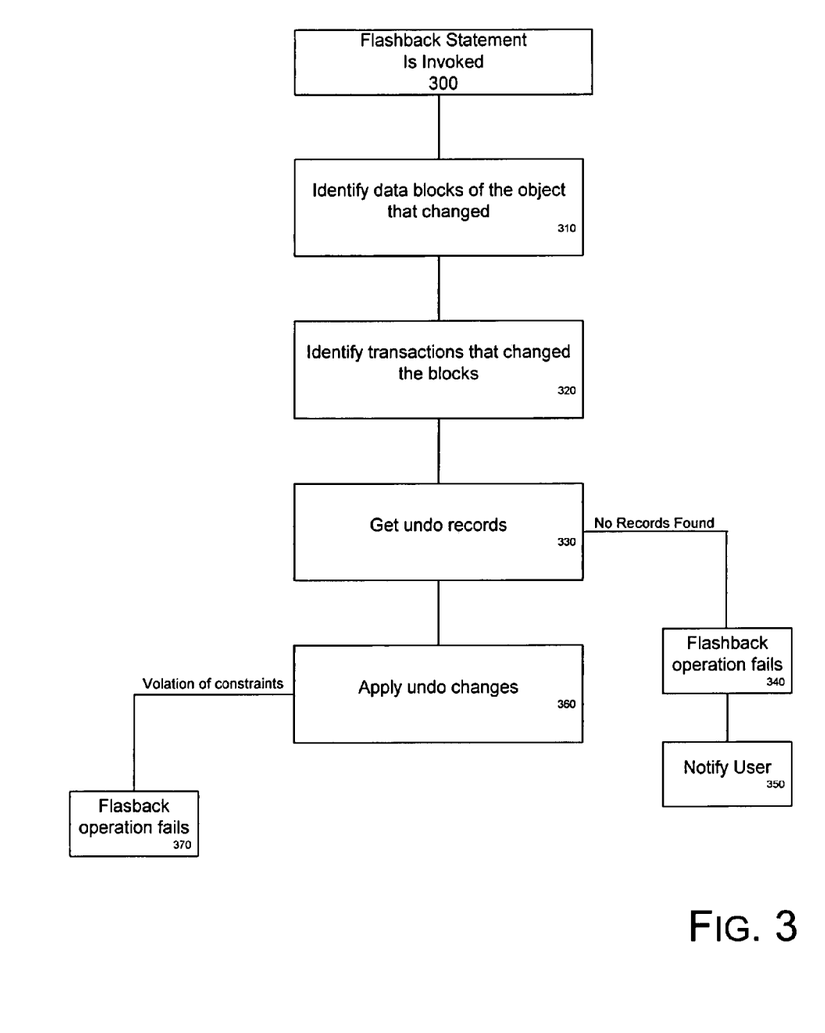
FIG. 3 is a flow diagram of a flashback process according to one embodiment of the invention.

Embodiments of the invention are further described with reference to FIG. 3. Although embodiments of the invention are described with reference to flashback table command for ease of understanding, the invention is not limited to flashback operation applied only to database tables and one skilled in the art will appreciate that the described embodiments may be utilized to flashback any database object.

At 300, the end user invokes a Flashback object statement specifying a database object, for example, a table, to be flashbacked and a point in time to which the object needs to be flashbacked. In one embodiment, the user may specify the actual wall clock time to which the object needs to be flashbacked. The specified flashback time is converted to a system commit number, corresponding to the specified time. The system commit number is generated at the end of each committed transaction. In another embodiment, the user specifies system commit number instead of the wall clock time.

In one embodiment only users with appropriate authorization privileges may invoke the Flashback command. For example, in order to issue Flashback commands, users need to have Select, Insert, Delete, Alter and Flashback privileges.

In one embodiment, at 310, the flashback module identifies blocks of the specified data object that were changed since the flashback time. The flashback module performs a full scan of the specified object, for example, a database table, to identify changed data blocks. In alternative embodiment, the flashback module scans log files which store information identifying changes introduced into the specified object instead of performing a full scan of the object. Yet in another embodiment, the flashback module checks data version numbers stored in metadata associated with each block of the specified object. It will be appreciated that the metadata may be associated with the database object and include information about each modified block. The version numbers may include a timestamp of a change, which the flashback module compares to the flashback time to determine whether a data block has been changed after the specified flashback time.

At 320, the flashback module identifies transactions that introduced changes into the specified data object. In one embodiment, metadata associated with data blocks of the object includes identification of the transactions that performed changes on a particular data block.

At 330 the flashback module identifies undo records storing information needed for restoring the data object to a state as of the flashback time. In one embodiment undo records are generated for each transaction.

At 360 the flashback module applies undo changes to restore the specified data object to the state as of the flashback time. In one embodiment, the flashback module restores every changed block of the data object one at the time by identifying transactions that modified the block and restoring the state of that particular block utilizing undo records associated with each transaction. In another embodiment, the flashback module reverses the changes introduced into the specified database object chronologically starting from the changes introduced immediately before the issuance of the flashback statement and ending with the changes introduced immediately after the flashback time.

In one embodiment the flashback operation fails at 340 if undo records necessary for restoring the state of the database object are not available. If there are enough undo records available to restore the database object to the state as of some time prior to the issuance of the flashback statement but later than the flashback time, the user is notified of the earliest time to which the object can be flashbacked. Thus, for example, if the flashback time is 27 hours prior to the current time, but the available undo records will only allow the flashback to the state that existed 24 hours ago, the flashback module notifies the user. In one embodiment, expired undo records if not overwritten may be utilized to flashback the object to the specified flashback time, for example to a state that existed 27 hours ago. As explained above, the expired records are those records maintenance of which is not necessary for the system's undo retention. The expired records may be overwritten by newly generated undo records.

In one embodiment of the invention, the state of constraints and indexes, as of the issuance of the flashback statement, are maintained. For example, flashing back multiple tables that are dependent on each other may violate certain constraints if the validation of these constraints is performed before all the dependent tables are flashed back. Constraints, triggers and indexes are concepts well known in the art and no further explanation is necessary. In one embodiment, if constraints are violated, the flashback operation is aborted.

In one embodiment the database manager may issue Flashback Cascade statement, that flashes back not only the specified database object, but also all objects that depend on the specified object and on which the specified object depends. This feature may avoid violation of constraints.

In one embodiment of the invention, different constraints are handled differently during the flashback operation. For example, NULL, NOT NULL and CHECK constraints in the majority of cases are satisfied by the restored data rows since rows existed in the database at the flashback time, thus these constraints are left enabled for the duration of the flashback operation. If the new constraint has been introduced since the flashback time, the user may disable the constraint, issue the flashback statement and then enable the constraint with a validate option.

The UNIQUE and PRIMARY KEY constraints are not deferrable because the associated index is maintained during the flashback operation. Disabling these constraints during the flashback operation and enabling them at the end of the flashback operation will require the rebuilding of the index, which is an expensive operation. These constraints are left enabled for the duration of the flashback operation, however to avoid uniqueness violation during the flashback operation, the current rows are removed prior to the insertion of the flashback time rows.

The IMMEDIATE constraints, which are usually set as not deferrable by the user, are deferred for the duration of the flashback operation according to one embodiment. The deferral of the IMMEDIATE constraints will not violate any rules because for the duration of the flashback operation, the specified table is locked and no other transactions are able to access the table, in addition the flashback operation is not performing any joins operation and, thus, IMMEDIATE constraints will not be used during the flashback operation.

According to one embodiment, the REFERENTIAL INTEGRITY constraints are deferred for the duration of the flashback operation to not prematurely violate referential dependencies. These constraints are evaluated just before the flashback operation is committed. If any violation occurs during the evaluation, the flashback operation is aborted without committing the changes to the tables and the tables are left in the state it was before the flashback statement was issued.

In one embodiment of the invention, triggers defined and enabled on the specified table are disabled for the duration of the flashback operation. The default disabling of triggers may be overridden by the user. The user may enable all the triggers defined on the specified table, or may enable only certain triggers from the set of triggers defined on the table. In one embodiment, the syntax of the flashback table statement includes an option of enabling/disabling all triggers or only specified triggers. In another embodiment, user may change the status of triggers by executing ALTER TRIGGER statement prior to issuing the flashback statement.

In one embodiment of the invention, the flashback operation is reversed by the user issuing another Flashback statement specifying time immediately prior to the previous flashback statement specified time. Undo records are maintained for the first flashback operation and these undo records are utilized to reverse the changes introduced by the first flashback operation.

In one embodiment of the invention, the user is presented with a graphical interface providing the user with identification of changes that need to be made to the specified database object in order to flash the object back to the flashback time. If the user accepts the changes, the changes are made to the object. If the user rejects the changes, the flashback operation is aborted.

General

Figure 4:
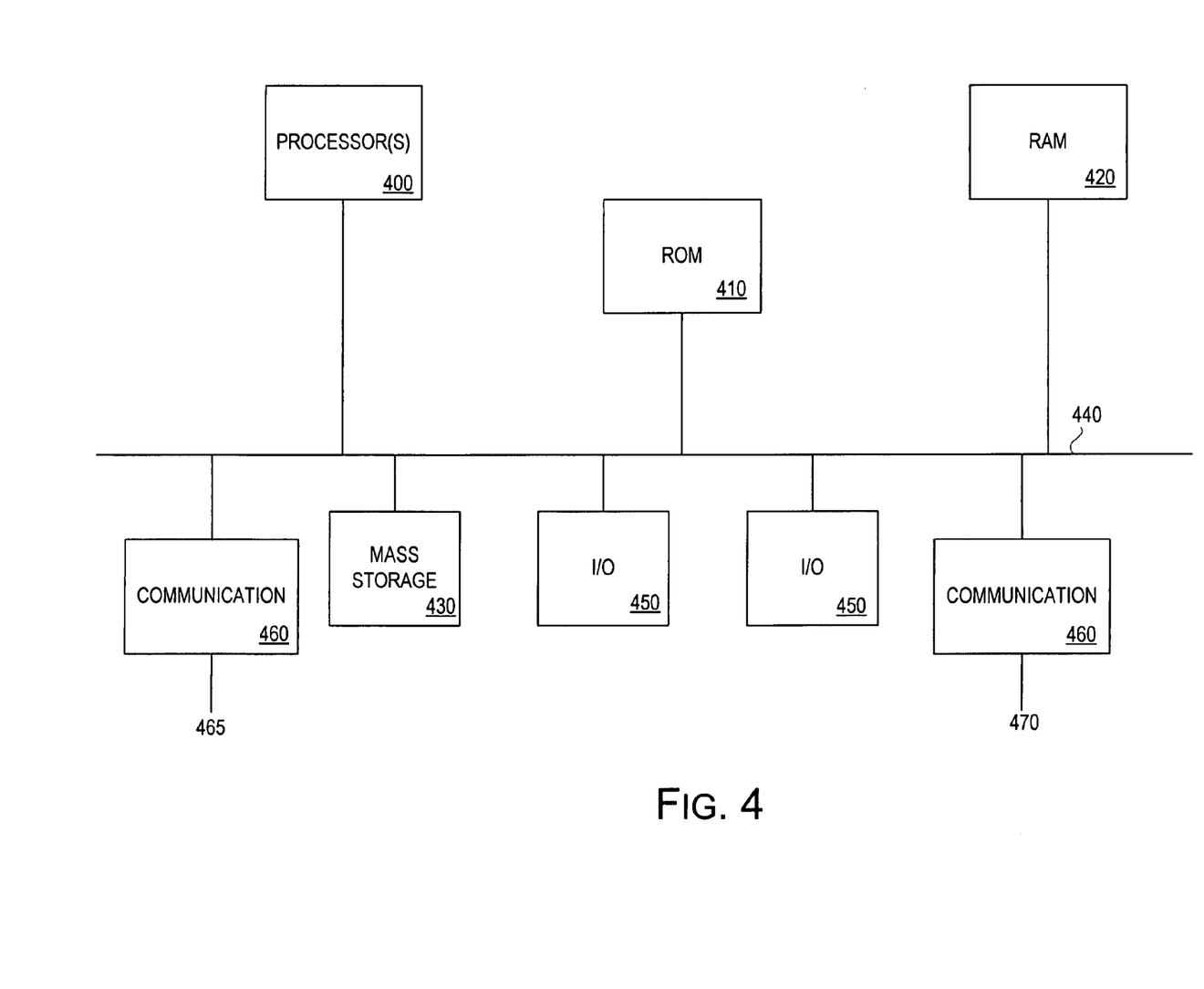
FIG. 4 illustrates a conventional processing system.

It will be appreciated that physical processing systems, which embody components of database system described above, may include processing systems such as conventional personal computers (PCs), embedded computing systems and/or server-class computer systems according to one embodiment of the invention. FIG. 4 illustrates an example of such a processing system at a high level. The processing system of FIG. 4 may include one or more processors 400, read-only memory (ROM) 410, random access memory (RAM) 420, and a mass storage device 430 coupled to each other on a bus system 440. The bus system 440 may include one or more buses connected to each other through various bridges, controllers and/or adapters, which are well known in the art. For example, the bus system 440 may include a 'system bus', which may be connected through an adapter to one or more expansion buses, such as a peripheral component interconnect (PCI) bus or an extended industry standard architecture (EISA) bus. Also coupled to the bus system 440 may be the mass storage device 430, one or more input/output (I/O) devices 450 and one or more data communication devices 460 to communicate with remote processing systems via one or more communication links 465 and 470, respectively. The I/O devices 450 may include, for example, any one or more of: a display device, a keyboard, a pointing device (e.g., mouse, touch pad, trackball), and an audio speaker.

The processor(s) 400 may include one or more conventional general-purpose or special-purpose programmable microprocessors, digital signal processors (DSPs), application specific integrated circuits (ASICs), or programmable logic devices (PLD), or a combination of such devices. The mass storage device 430 may include any one or more devices suitable for storing large volumes of data in a non-volatile manner, such as magnetic disk or tape, magneto-optical storage device, or any of various types of Digital Video Disk (DVD) or Compact Disk (CD) based storage or a combination of such devices.

The data communication device(s) 460 each may be any device suitable to enable the processing system to communicate data with a remote processing system over a data communication link, such as a wireless transceiver or a conventional telephone modem, a wireless modem, an Integrated Services Digital Network (ISDN) adapter, a Digital Subscriber Line (DSL) modem, a cable modem, a satellite transceiver, an Ethernet adapter, Internal data bus, or the like.

The term "computer-readable medium", as used herein, refers to any medium that provides information or is usable by the processor(s). Such a medium may take may forms, including, but not limited to, non-volatile and transmission media. Non-volatile media, i.e., media that can retain information in the absence of power, includes ROM, CD ROM, magnetic tape and magnetic discs. Volatile media, i.e., media that cannot retain information in the absence of power, includes main memory. Transmission media includes coaxial cables, copper wire and fiber optics, including the wires that comprise the bus. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Thus, methods and apparatuses for updating databases have been described. Although the invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

The invention claimed is:

1. A method for online recovery for a database system using an undo record comprising:
   receiving a flashback request;
   generating a flashback operation for a database associated with the undo record, wherein changes introduced to the database by each transaction are stored in the undo record associated with the transaction and a database object in the database;
   identifying the object in the database that was changed since the flashback time by scanning for metadata associated with the object, wherein the metadata tracks the changes and is not a portion of the transaction log; and
   restoring the database object to a state as of a flashback time by reversing the changes introduced into the database object after the flashback time specified in the flashback request without taking the database system offline.

2. The method of claim 1 wherein the reversing the changes comprises reversing the changes in a sequence starting with a change introduced into the database object immediately before issuance of the flashback request and ending with a change introduced into the database object immediately after specified flashback time.

3. The method of claim 1 wherein the reversing the changes comprises restoring every changed block of the database object one at the time.

4. The method of claim 1 wherein the reversing the changes comprises identifying blocks of the database object that were changed since the flashback time.

5. The method of claim 4 wherein the reversing the changes further comprises identifying transactions that modified the blocks.

6. The method of claim 5 wherein the reversing the changes further comprises identifying undo records associated with the transactions.

7. The method of claim 6 further comprising notifying a user issuing the request that a flashback operation failed if not enough undo records are available.

8. The method of claim 7 wherein the user has privileges for issuing the flashback request.

9. The method of claim 1 further comprising restoring database objects that depend on the database object and on which the database object depends.

10. The method of claim 4 further comprising performing a full scan of a specified object and identifying undo records associated with the specified object.

11. The method of claim 4 further comprising examining metadata associated with the database object.

12. The method of claim 4 further comprising examining log files comprising information identifying changed blocks of the database object.

13. The method of claim 1 further comprising maintaining state of constraints and indexes.

14. The method of claim 13 further comprising maintaining NULL, NOT NULL and CHECK constraints enabled for duration of the flashback operation.

15. The method of claim 13 further comprising enabling UNIQUE and PRIMARY KEY constraints during the flashback operation and enabling the UNIQUE and PRIMARY KEY constraints at the end of the flashback operation.

16. The method of claim 13 further comprising deferring IMMEDIATE constraints for duration of the flashback operation.

17. The method of claim 13 further comprising deferring REFERENTIAL INTEGRITY constraints for duration of the flashback operation.

18. The method of claim 1 further comprising disabling triggers defined on the specified database object for duration of the flashback operation.

19. The method of claim 1 further comprising reversing the flashback operation and restoring the database object back to its state before issuance of the flashback request.

20. The method of claim 1 wherein the flashback time is a wall clock time.

21. The method of claim 1 wherein the flashback time is a system commit number.

22. An apparatus for online recovery for a database system using an undo record comprising:
   means for generating a flashback operation for a database associated with the undo record, wherein changes introduced to the database by each transaction are stored in the undo record associated with the transaction and a database object in the database in response to a flashback request;
   means for identifying the object in the database that was changed since the flashback time by scanning for metadata associated with the object, wherein the metadata tracks the changes and is not a portion of the transaction log; and
   means for restoring the database object to a state as of a flashback time by reversing the changes introduced into the database object after the flashback time specified in the flashback request without taking the database system offline.

23. The apparatus of claim 18 wherein the database object is a database table.

24. The apparatus of claim 18 further comprising means for restoring database objects that depend on the database object and on which the database object depends.

25. The method of claim 18 further comprising means for maintaining state of constraints and indexes.

26. The apparatus for online recovery for a processing system having a database system using an undo record comprising:
   flashback module of the processing system for a database associated with the undo record to restore a database object in the database to a state as of a specified flashback time in response to a flashback request by
   identifying blocks of the database object that were changed since the flashback time by scanning for metadata associated with the object,
      wherein the metadata tracks the changes and is not a portion of the transaction log;
   identifying transactions that changed the blocks; identifying undo records and restoring the database object in the database to a state as of the flashback time utilizing the undo records without taking the database system offline,
      wherein changes introduced to the database by the transactions are stored in the undo records associated with the transactions and the database object.

27. The apparatus of claim 26 wherein the identifying blocks of the database object comprises performing a full scan of the database object.

28. The apparatus of claim 26 wherein the identifying blocks of the database object comprises accessing log files including information about changed blocks.

29. The apparatus of claim 26 wherein the identifying blocks of the database object comprises accessing metadata associated with the database object.

30. The apparatus of claim 22 further comprising the flashback module to restore database objects that depend on the database object and on which the database object depends.

31. The method of claim 22 further comprising the flashback module to maintain state of constraints and indexes.

32. An article of manufacture for online recovery for a database system using an undo record comprising:
   a computer-readable memory or storage medium having stored therein instructions which, when executed by a processor, cause a processing system to perform a method comprising:
   generating a flashback operation for a database associated with the undo record, wherein changes introduced to the database by each transaction are stored in the undo record associated with the transaction and a database object in the database in response to a flashback request;
   identifying the object in the database that was changed since the flashback time by scanning for metadata associated with the object, wherein the metadata tracks the changes and is not a portion of the transaction log; and
   restoring the database object in the database to a state as of a specified flashback time by reversing the changes introduced into the database object after a flashback time specified in the flashback request without taking the database system offline.

33. The article of manufacture of claim 32 wherein the database object is a table.

34. The article of manufacture of claim 32 comprising a computer-readable medium having stored therein instructions which, when executed by a processor cause a processing system to perform a method wherein the flashback time is a wall clock time.

35. The article of manufacture of claim 32 comprising a computer-readable medium having stored therein instructions which, when executed by a processor cause a processing system to perform a method wherein the flashback time is a system commit number.

* * * * *

UNITED STATES PATENT AND TRADEMARK OFFICE
CERTIFICATE OF CORRECTION

PATENT NO. : 7,499,953 B2
APPLICATION NO. : 10/831449
DATED : March 3, 2009
INVENTOR(S) : Krishnaswamy et al.

It is certified that error appears in the above-identified patent and that said Letters Patent is hereby corrected as shown below:

In column 7, line 53, in claim 22, delete "log; and" insert -- log, wherein the means for identifying the object in the database comprises a processor; and --, therefor.

In column 8, line 55-58, in claim 34, after "claim 32" delete "comprising a computer-readable medium having stored therein instructions which, when executed by a processor cause a processing system to perform a method".

In column 8, line 60-63, in claim 35, after "claim 32" delete "comprising a computer-readable medium having stored therein instructions which, when executed by a processor cause a processing system to perform a method".

Signed and Sealed this
Twelfth Day of July, 2011

David J. Kappos
*Director of the United States Patent and Trademark Office*